United States Patent
Pape et al.

(10) Patent No.: US 7,703,934 B2
(45) Date of Patent: Apr. 27, 2010

(54) POWER OUTAGE LIGHT SOCKET DEVICE

(75) Inventors: Robert J. Pape, Ponte Vedra Beach, FL (US); Jeffrey Bowman, Atlantic Beach, FL (US); Ambreese Sharif Hill, Jacksonville, FL (US)

(73) Assignee: Hunter Fan Company, Memphis, TN (US)

( * ) Notice: Subject to any disclaimer, the term of this patent is extended or adjusted under 35 U.S.C. 154(b) by 246 days.

(21) Appl. No.: 11/497,053

(22) Filed: Aug. 1, 2006

(65) Prior Publication Data

US 2008/0030140 A1    Feb. 7, 2008

(51) Int. Cl.
*F21V 19/04* (2006.01)

(52) U.S. Cl. ............ 362/20; 362/228; 362/229; 362/205; 362/208; 362/650; 361/70; 315/86

(58) Field of Classification Search ............ 362/20, 362/228, 229, 227, 183, 205, 208, 650; 361/170; 315/86
See application file for complete search history.

(56) References Cited

U.S. PATENT DOCUMENTS

| | | | |
|---|---|---|---|
| 1,542,768 A | 6/1925 | Heitz | |
| 2,735,928 A | 2/1956 | Smethurst | |
| 2,863,038 A | 12/1958 | Lombardo | |
| 4,096,553 A * | 6/1978 | Roche | 362/183 |
| 4,177,500 A | 12/1979 | Nicholl et al. | |
| 4,985,661 A | 1/1991 | Lin | |
| 5,412,554 A * | 5/1995 | Lee | 362/449 |
| 5,426,347 A | 6/1995 | Nilssen | |
| 5,700,154 A * | 12/1997 | Geary | 439/236 |
| 5,713,655 A | 2/1998 | Blackman | |
| 5,734,229 A | 3/1998 | Bavaro et al. | |
| 6,107,744 A * | 8/2000 | Bavaro et al. | 315/86 |
| 6,113,433 A * | 9/2000 | Al-Turki | 439/639 |
| 6,390,646 B1 * | 5/2002 | Yan | 362/260 |
| 2002/0074027 A1 * | 6/2002 | Maidment | 135/16 |
| 2005/0099787 A1 * | 5/2005 | Hayes | 362/20 |
| 2005/0157482 A1 * | 7/2005 | Hsu | 362/20 |
| 2006/0146527 A1 * | 7/2006 | VanderSchuit | 362/228 |

* cited by examiner

*Primary Examiner*—Sandra L O'Shea
*Assistant Examiner*—Jessica L McMillan
(74) *Attorney, Agent, or Firm*—Baker Donelson

(57) ABSTRACT

A power outage socket device that may be installed on a variety of lamps or light fixtures. The bottom of the device has a male connector adapted to be inserted into the light socket on the lamp or light fixture, in place of the light bulb. A female socket adapted to receive the light bulb is located on the top of the device. The male connector may be recessed. When power is interrupted, emergency power is provided to one or more emergency light sources on the device to provide light. Emergency power is provided by one or more batteries, which may be rechargeable. The device also may include means for connecting a lamp harp, or for allowing a lamp harp to pass through the device. A photoelectric light sensor may be used to detect ambient light and control whether emergency light is provided when normal power is interrupted.

5 Claims, 3 Drawing Sheets

POWER OUTAGE LIGHT SOCKET DEVICE

TECHNICAL FIELD

The present invention relates to lighting devices and sockets. More particularly, the present invention relates to a light socket system that can function when there is a power failure.

BACKGROUND OF THE INVENTION

Conventional light sources are reliant upon the availability of an external power supply. Such light sources cannot function when the power supply is absent or interrupted.

It is known in the art to provide back-up lighting in the event of a power failure. Many such lighting systems, however, must be hardwired and installed by a professional electrician or person with similar training and skills. In addition, many emergency light devices have complicated installation procedures, take up additional space, and do not have an aesthetic appearance or shape. And many such systems provide a light source separate from the normal light source that functions when the power supply is available.

Accordingly, what is needed is a lighting power source that can function when the power supply is interrupted, but is easily installed and unobtrusive, and usable with a variety of existing lamps. It is to such that the present invention is directed.

SUMMARY OF THE INVENTION

This invention is directed to a power outage socket device that may be installed on a standard desk or table lamp with a light bulb and a shade supported by a harp. In one exemplary embodiment, the power outage socket device is generally cylindrical, with a top and bottom, although it may be any suitable shape. The bottom of the device has a male connector adapted to be inserted into the light socket on the lamp, in place of the light bulb. A female socket adapted to receive standard light bulbs is located on the top of the device.

In an exemplary embodiment, the male connector may extend from the surface of the bottom of the device. Alternatively, the male connector may be partially or wholly recessed within the device by means of a recess hole. The recess hole may be of sufficient diameter to accommodate any light switch and lamp harp holders on the lamp.

In one exemplary embodiment, lamp harp receptors may be located on the top of the device, or in recessed holes in the top of the device. In another exemplary embodiment, two or more holes extending through the device may be used to allow the ends of the lamp harp to extend through the device and fasten directly to the lamp harp holders on the lamp. In an alternative embodiment, two slots may extend from the outer circumference of the device into the center to allow the ends of the lamp harp to extend through the device and fasten directly to the lamp harp holders on the lamp.

Means for controlling the provision of power to the light bulb inserted into the female socket on the top of the device during normal operation may be provided. This may be a power switch located on the exterior of the device.

In yet another exemplary embodiment, the device contains one or more batteries, which may be rechargeable, to provide emergency power in the case where normal power is interrupted. Emergency power may be used to provide power to the light bulb or one or more light sources located on the device. The additional light sources may include light emitting diodes (LEDs) or the like.

In one embodiment, a photoelectric light sensor may be used to detect ambient light, and determine whether or not the emergency light sources should be activated. The device also may comprise an activation switch the control the activation and operation of the emergency light sources, and means for control the level of light, or the number of emergency light sources activated.

Still other advantages of various embodiments will become apparent to those skilled in this art from the following description wherein there are shown and described exemplary embodiments of this invention simply for the purposes of illustration. As will be realized, the invention is capable of other different aspects and embodiments without departing from the scope of the invention. Accordingly, the advantages, drawings, and descriptions are illustrative in nature and not restrictive in nature.

DETAILED DESCRIPTION

Figure 1:
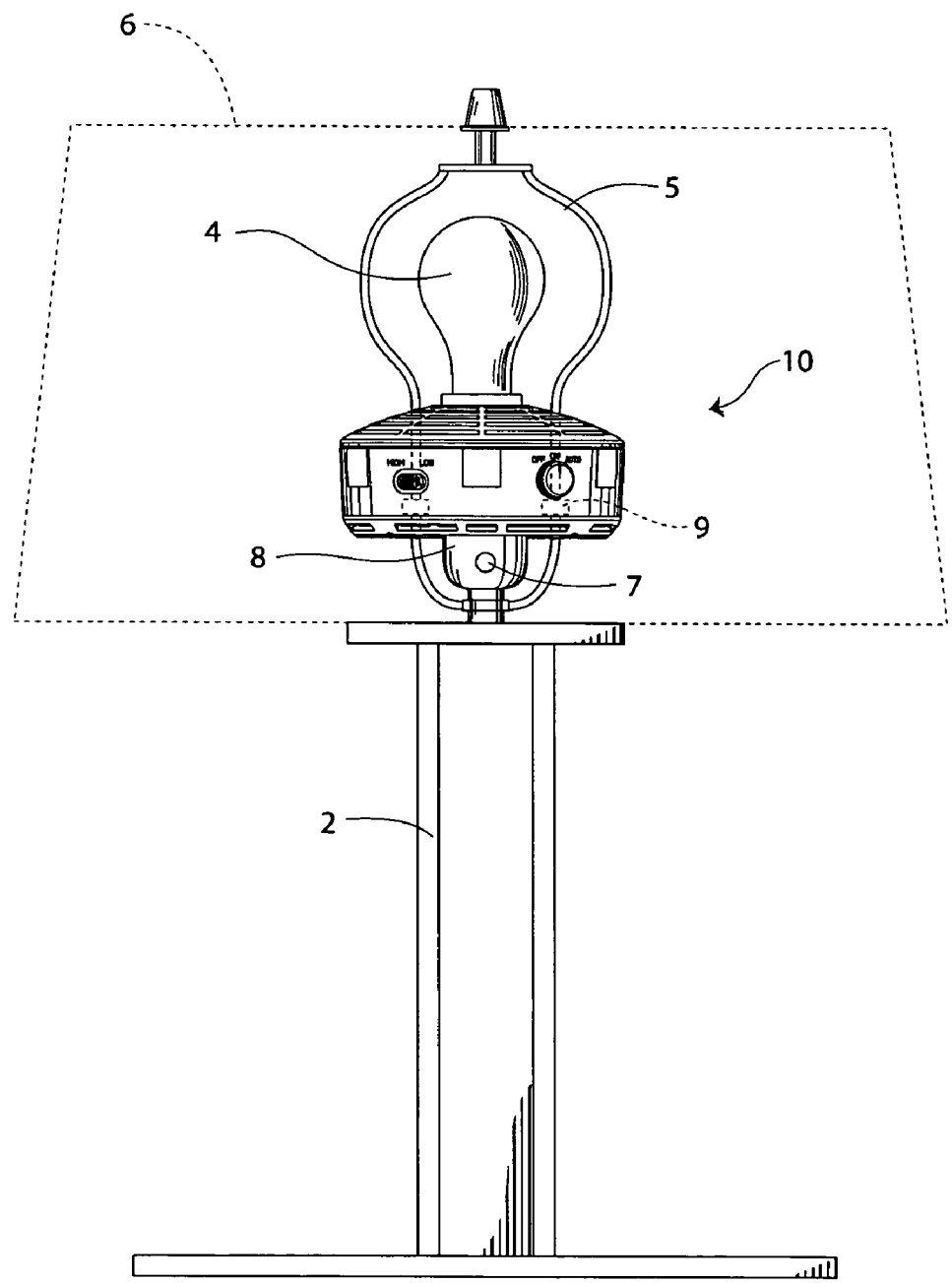
FIG. 1 is a side view of a power outage light socket device of the present invention, shown mounted to a conventional lamp.
Figure 2:
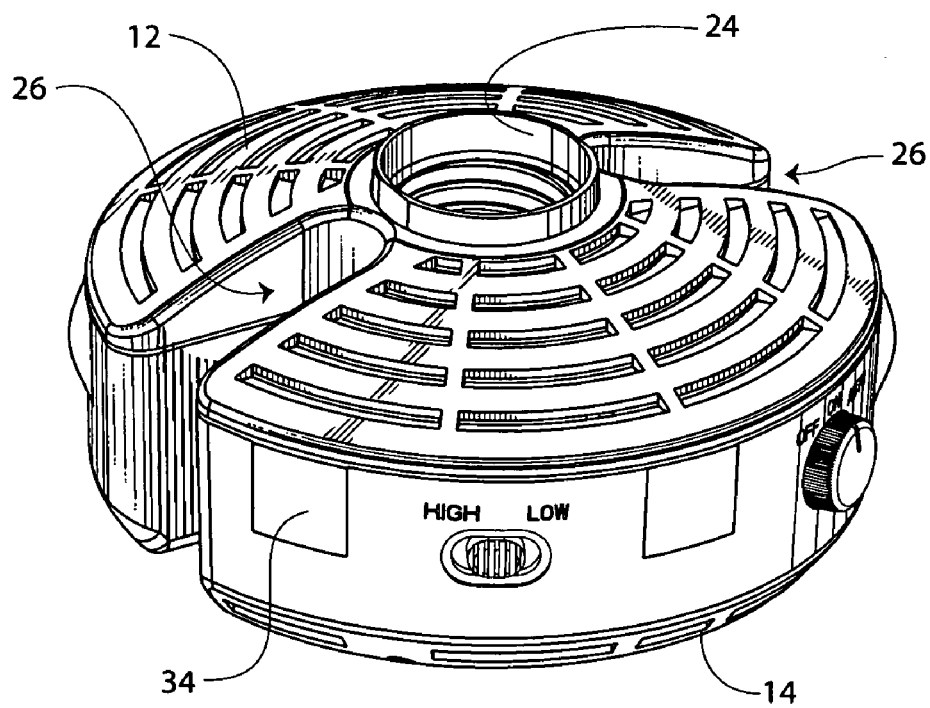
FIG. 2 is a perspective view of the power outage light socket device of FIG. 1.
Figure 3:
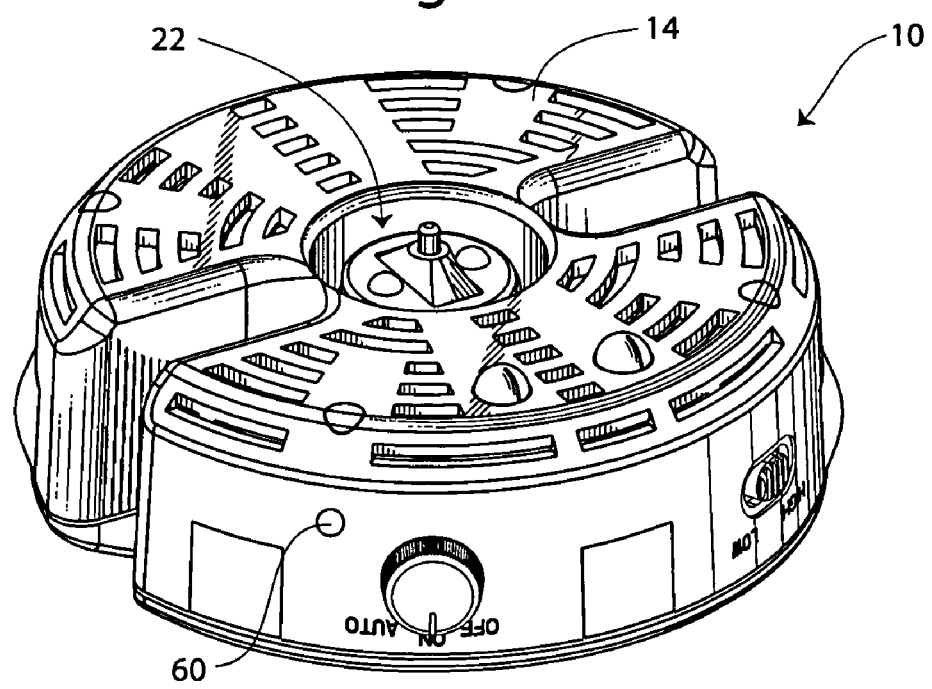
FIG. 3 is an inverted perspective view of the power outage light socket device of FIG. 1.
Figure 4:
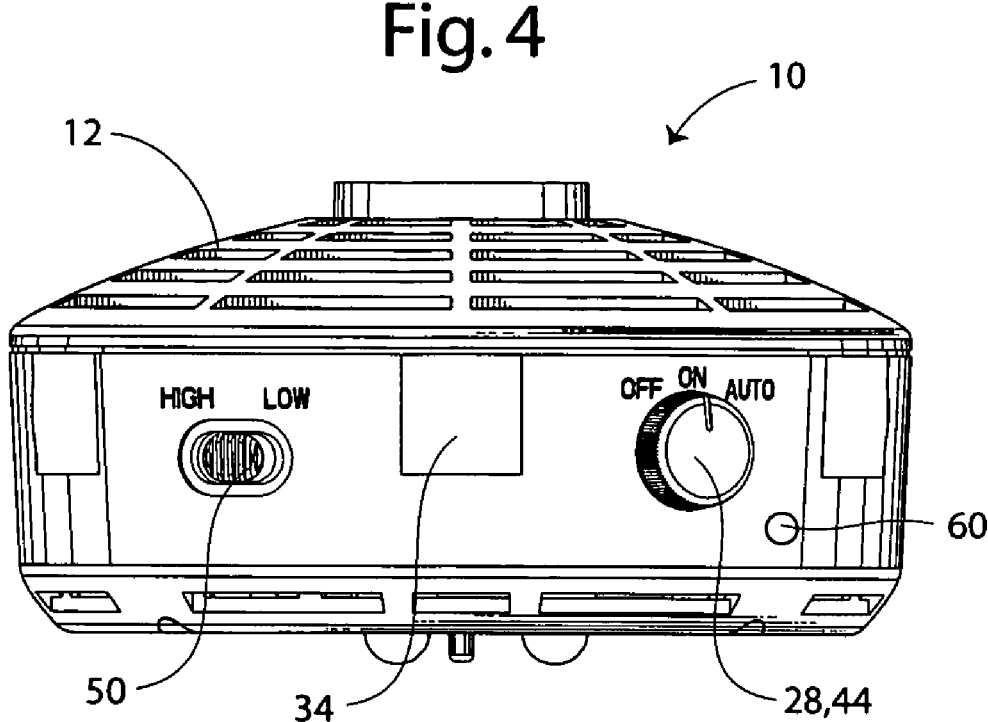
FIG. 4 is a side view of the power outage light socket device of FIG. 1.
Figure 5:
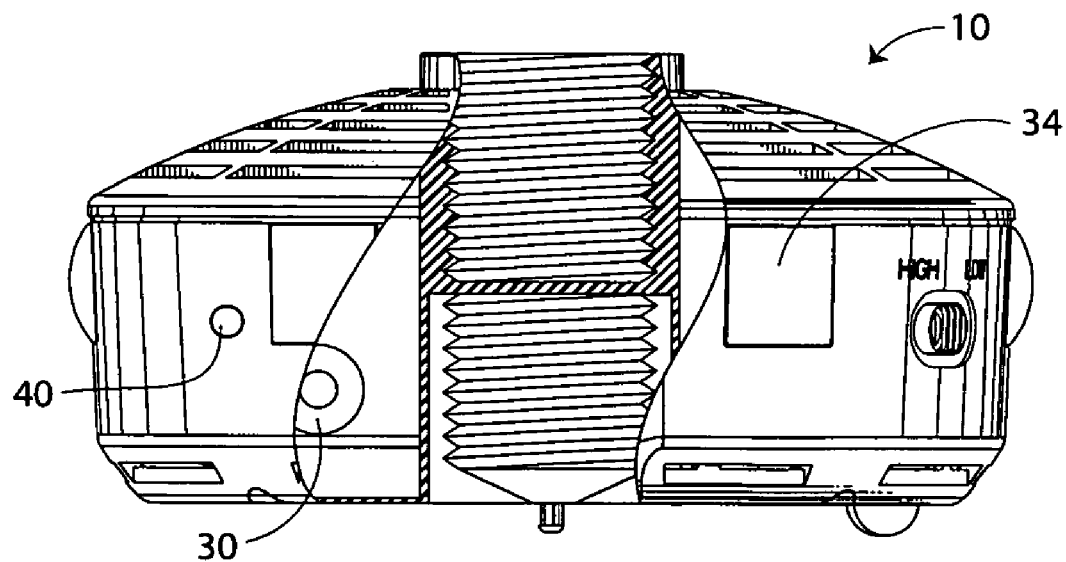
FIG. 5 is a side view of the power outage light socket device of FIG. 1.

Referring now in more detail to the drawings in which like parts have like identifiers, FIG. 1 shows a side view of an exemplary embodiment of a power outage socket device 10 installed on a standard desk or table lamp 2 with a light bulb 4 as the light source, with a lamp shade 6. The lamp 2, light bulb 4, and lamp shade 6 may be of any configuration known in the art, and during normal operation, power is supplied by a standard AC plug (not shown) or other power means known in the art.

As shown in FIGS. 1-5, the power outage socket device 10 is generally cylindrical, with a top 12 and a bottom 14, although the device 10 may be some other shape, including, but not limited to, a box or globe. The bottom 14 of the power outage socket device 10 has an externally threaded male connector 20 adapted to mount within the light socket 8 of the lamp 2, in place of the light bulb 4. The male connector 20 may extend from the surface of the bottom 14, or may be partially or wholly recessed within the device 10 by means of a recess hole 22. In the latter configurations, the recess hole 22 may be of sufficient diameter to accommodate the lamp light switch 7 and lamp harp holders 9. The male connector 20 includes the metal contacts necessary to provide an electrical connection with the lamp socket.

The top 12 of the device 10 has an internally threaded female socket 24 adapted to receive standard light bulbs, and one or more pairs of lamp harp receptors 26 to receive the ends of a standard lamp harp 5. The female socket 24 includes the metal contacts necessary to provide an electrical connection with the light bulb 4. The lamp harp receptors 26 allow the ends of the lamp harp 5 to pass through the device 10 and be inserted into the lamp harp holders 9 on the original lamp fitting. It should be understood that the receptors 26 may be of any shape or may be a hole rather than a slot. The receptor 26 may also be adapted to take the place of the conventional harp holder 9.

The female socket 24 may also be partially or wholly recessed within the device 10, as may be the lamp harp receptors 26. These various embodiments allow for a user to maximize accessibility to the lamp light switch 7 during normal operation while keeping the device 10 and the light bulb 4 when placed in the female socket 24 appropriately placed in relation to the lamp 2 and shade 6. For example, as a general matter of safety, the light bulb 4 should not be elevated so as to be too close to the lamp shade 6. As a matter of aesthetics, the bottom 14 of the device 10 should not extend below the bottom edge of the lamp shade 6, and in one or more exemplary embodiments, should be above the bottom edge of the lamp shade 6.

In one exemplary embodiment, a light power switch 28 may be located on the exterior of the device 10 to allow the lamp to be turned off and on during normal operation. In this embodiment, the original light switch 7 may be left in an "on" position, with the light power switch 28 being more easily accessed and used for normal operations. This embodiment is of particular use when the male connector 20 is recessed into the bottom 14 of the device 20, so as to render the original light switch 7 more difficult to reach.

The device 10 houses one or more batteries 30, preferably the batteries being rechargeable. Preferably, recharging is accomplished during normal operation of the lamp with the standard A.C. current (i.e., when normal power is available). In this embodiment, the batteries 30 may be built into the device 10. Alternatively, the recharging of the batteries may be done by removal of the batteries and placing them in a standard recharging device.

The device also includes one or more emergency light sources 34 located about the housing. In one exemplary embodiment, as seen in FIGS. 1-5, six light sources 34 are located evenly spaced along the upper side of the device 10. The emergency light sources may include, but are not limited to, light emitting diodes (LEDs), small light bulbs, or the like.

The light sources 34 receive power from the batteries 30 and provide light when the normal power supply is interrupted. In one embodiment, a photoelectric light sensor 40 may be used to detect ambient light, and can determine whether or not the light sources 34 should be activated. For example, if it is daylight when the power is interrupted, and the lamp is not located in a dark location, the lights 34 are not turned out, thus conserving the energy in the batteries 30.

The device also may comprise an activation switch 44 as an alternative to the previously described light power switch 28. The activation switch 44 controls the activation and operation of the light sources 34, similarly to the light power switch with the exception of the additional automated feature described in more detail hereinafter. The activation switch 44 may have multiple switches or settings, and may, in one embodiment, be used to turn the light sources 34 on and off manually. An automatic setting also may be provided, where the light sources 34 may be turned on automatically upon power failure and in the absence of ambient light. The activation switch 44 may be coupled with or provide the function of the light power switch 28. For example, the activation switch 44 may have three positions: ON, OFF, AUTO. When normal power is available, the ON and OFF positions would control the operation of the light bulb inserted into the female socket 24. When normal power is interrupted, the ON and OFF positions would control the operation of the emergency light sources 34. The AUTO position would cause the emergency light sources 34 to come on when the normal power is interrupted and the photoelectric light sensor 40 detects that the room or area is dark.

The device 10 may further comprise a dimmer switch 50, which may be used to control the level of light provided by the emergency light sources 34, or alternatively, the number of light sources 34 that are activated. For example, if there are six light sources 34, as shown in FIGS. 1-5, then the dimmer switch 50 could provide options for the number of light sources that are activated. Activating fewer light sources 34 would result in a longer period of time the light sources 34 can provide light. Accordingly, in one exemplary embodiment, the dimmer switch 34 has a high and a low setting, and when used with six LEDs as light sources 34, the low setting could cause three LEDs to provide light for a period of time, such as 16 hours, while the high setting could cause six LEDs could provide a higher level of light for a shorter period of time, such as 8 hours. The actual duration, of course, would depend on the emergency light sources use and the amount of power stored in the batteries. The dimmer switch 50 may be coupled with either the activation switch 44 or the light power switch 28, or both.

The device may also include an optional power signal light 60, which may be an LED or similar light source, which automatically turns on to illuminate the device 10 when the normal power is interrupted. The power signal light 60 helps identify the location of the device 10 to an individual in the darkened area, which is especially helpful when the automatic feature is not activated.

The device 10 is not limited to use with table and desk lamps, but may be used with other light fixtures, including, but not limited to, ceiling light fixtures. The male connector 20, the female socket 24, or both, would be of a suitable size and shape to match the light fixture with which the device 10 is used.

It should be understood that the batteries may provide current to the conventional light bulb 4 or the light sources 34 in case of emergency. As such, the device provides a manner in which to convert a conventional light to an emergency use light should a power failure occur.

Thus, it should be understood that the embodiments and examples have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art, and variations and changes may be made by those skilled in the art without departing from the spirit of the invention. Accordingly, it is intended that the scope of the invention be defined by the claims appended hereto.

We claim:

1. A power outage light socket device adapted to be used in conjunction with a conventional light socket and light bulb, comprising:

a housing assembly;

a male connector extending from said housing assembly configured to be received and electrically coupled with a light socket;

a female socket extending into said housing configured to receive and be electrically coupled with a light bulb;

at least one battery housed in said housing assembly, and an electrical circuit coupling said battery with said female socket to provide power to the light bulb through said female socket when outside power to the light socket is interrupted, wherein two or more slots extending inward from an outer edge of the housing assembly configured to receive a harp of a lamp.

2. The power outage light socket device of claim 1 further comprising a photoelectric light sensor coupled to said electrical circuit.

3. The power outage light socket device of claim 1 wherein said electrical circuit includes a power switch.

4. The power outage light socket device of claim 1 wherein said battery is rechargeable and wherein said electrical circuit includes means for recharging said battery.

5. A power outage light socket device adapted to be used in conjunction with a conventional light socket and light bulb, comprising:

a housing assembly;

a conventionally threaded male connector extending from said housing assembly configured to be received and electrically coupled with a light socket;

a conventionally threaded female socket extending into said housing configured to receive and be electrically coupled with a light bulb;

at least one battery housed in said housing assembly, and an electrical circuit coupling said battery with said female socket to provide power to the light bulb through said female socket when outside power to the light socket is interrupted wherein the conventionally threaded male connector is recessed within the bottom of the housing assembly.

\* \* \* \* \*